United States Patent [19]

Story et al.

[11] 4,053,339
[45] Oct. 11, 1977

[54] METHOD OF MAKING COMPOSITE PAPER HARDBOARD PANEL

[75] Inventors: Charles F. Story; Donald B. Gibson, both of Rock Hill, S.C.

[73] Assignee: Champion International Corporation, Stamford, Conn.

[21] Appl. No.: 584,175

[22] Filed: June 5, 1975

[51] Int. Cl.² ................................................ D21J 1/08
[52] U.S. Cl. .................................. 156/62.2; 162/158; 162/165; 162/183; 162/184; 162/185; 162/186; 162/225; 427/203; 427/206; 427/325; 427/393; 427/397; 427/408; 427/415; 427/420; 427/421; 428/326; 428/535
[58] Field of Search ............... 428/326, 535; 156/62.2; 162/225, 165, 158, 183-186; 427/203, 206, 325, 397, 393, 408, 415, 420, 421

[56] References Cited

U.S. PATENT DOCUMENTS

| 2,629,674 | 2/1953 | Ericks .............................. 162/164 R |
| 2,872,337 | 3/1959 | Heritage et al. ...................... 162/165 |

FOREIGN PATENT DOCUMENTS

| 711,688 | 6/1965 | Canada ................................ 428/326 |
| 733,022 | 4/1966 | Canada ................................ 428/326 |
| 940,576 | 7/1960 | United Kingdom ................. 428/326 |
| 1,190,816 | 5/1970 | United Kingdom ................. 428/326 |

Primary Examiner—Ralph S. Kendall
Assistant Examiner—John D. Smith
Attorney, Agent, or Firm—Evelyn M. Sommer

[57] ABSTRACT

A composite dry process hardboard includes a hardboard panel consisting of pressed defibrated and refined wood chips, plus a surface layer of paper cemented to the hardboard by a cured resin made from phenolic resin mixed with water and ethylene glycol. If desired, an embossed pattern may be incorporated into pressing the paper overlay. In the subject process, first a mass of defibrated wood chips is mixed with a binding agent, the mass is then formed into a mat which is coated with a mixture of phenolic resin and polyhydric compound such as a polyhydric alcohol having a boiling point higher than water. Then, a dry sheet of paper is laid on the mat and the composite structure is then cured by the application of heat and pressure.

3 Claims, 4 Drawing Figures

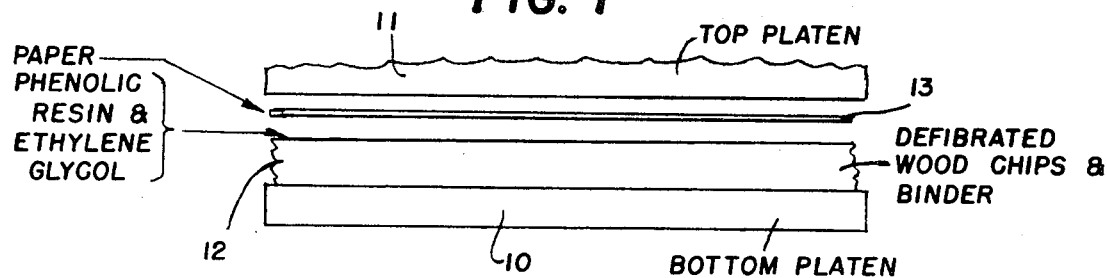
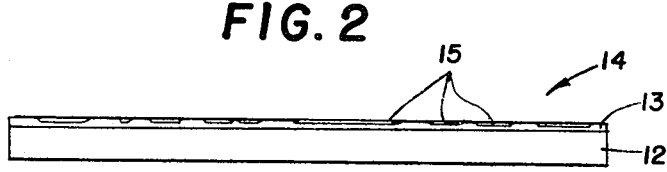
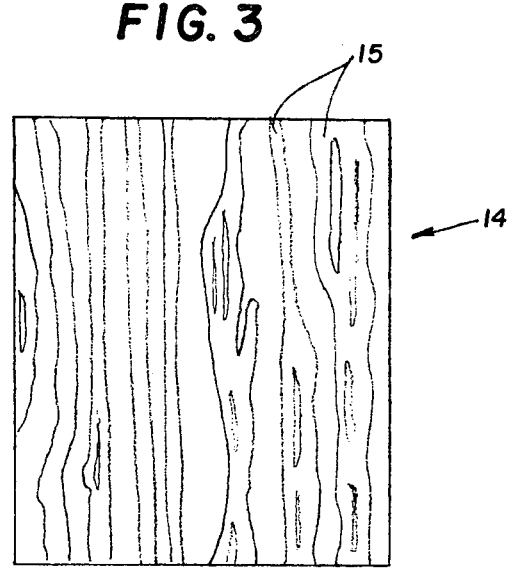

METHOD OF MAKING COMPOSITE PAPER HARDBOARD PANEL

BACKGROUND OF THE INVENTION

Many different methods have been developed for the production of board products by reducing wood or other lignocellulose products to fine particles and forming such particles into a unitary mat, followed by consolidating the mat into a solid board by the application of heat and pressure.

In general, two of such methods are the wet process and the dry process. In the wet process a pulp mat is prepared from aqueous slurry of wood fibers and formed into a thick sheet in a manner similar to the conventional paper manufacturing process and the mat is pressed into a fiber board panel. In the dry process an aqueous slurry is never used. The fibers have a moisture content of from about 5% to 100% based on the dry weight of the fiber. The term "dry process" or "dry formed" usually indicates that the fibers are conveyed in a gaseous stream rather than a liquid stream to a filter and formed into a mat which is consolidated while still moist into hardboard by the application of heat and pressure. However, particles or chip board materials may be mechanically conveyed in the dry process for felting or forming. In the manufacture of dry process hardboard using phenolic or modified phenolic resins, curing of the resin and possibly stabilizing the panel is accomplished by pressing between platens heated to 400° F or above. Even though the process is termed "dry," moisture generally in the range of 5 to 8% is required for good consolidation. It has been found that in thick panels, particularly those above ¼ inches in thickness, it is difficult to secure surfaces that are not soft. These surfaces have low abrasion resistance, and are absorptive of paint or adhesive material. Generally, soft surfaces on hardboard and particleboard have been attributed to pre-cure of the resins.

However, it is the inventor's contention that it is the migration of moisture away from the surface before the resin flows to bond the fibers that result in soft surfaces. It has been found that panels are improved by the addition of moisture to mat surfaces prior to their entering the press. To prevent the rapid migration of the moisture away from the surface of the panel before the resin flows to bond the fibers, the use of surface added moisturizers for hardboard manufacture has been employed, and this technique is the subject matter of applicant's co-pending application, U.S. Ser. No. 289,370, now abandoned filed Aug. 31st, 1972, and entitled "Surface Added Plasterizers For Hardboard Manufacture." In applicant's co-pending application, a mixture of water and ethylene glycol as a surface spray is employed in the manufacture of panels resulting in a superior surface. Surface flow or consolidation is obtained. However, an undesirable side effect is an increase in the tendency of the panel to stick to the plates against which they are pressed during the manufacturing process. To overcome this, the process may require the steps of subsequently sanding the manufactured panels.

The shortcoming of sticking of the panel to the platen plates is not acceptable for panels that are to be finished without sanding. Thus, in applications wherein the finished product is a 7/16 inches siding having a smooth or textured surface, finishing by sanding is not acceptable. Smooth panels are primed for finishing painting in the field, or overlaid with a polyfluoride film. On the other hand, textured panels are sold raw, primed, or finished.

Thus, it is an object of the subject invention to eliminate sticking of the resulting hardboard panel, and this is achieved by the application of a dry paper overlay, such as newsprint which may be most easily obtained, on the hardboard panel prior to final curing. It has been found that a good bond is achieved between the paper overlay and the panel by the use of a mixture of phenolic resin and the preferred plastisizer, ethylene glycol. It is a combination of these components that provide the satisfactory bond, with enough of the resin impregnating the paper to result in a composite panel having excellent resistance to weathering. It has also been found that overlaid panels, made according to the subject invention, have excellent finishing properties, have good paint holdout, resistance to scuffing, and are easily and cleanly cut.

During the manufacture of the subject composite panel, use is made of a polyhydric compound such as a polyhydric alcohol, an ester thereof, or a low polymer of ethylene glycol, having a boiling point above that of water so that it does not move readily from the surface of the panel during heating, and makes it possible to obtain a superior panel when the alcohol or ester is used in conjunction with a phenolic or similar resin to bond the paper overlay to hardboard during pressing. Two polyhydric compounds which will satisfy the requirements of having a boiling point above that of water are ethylene glycol and glycerine. The esters of these compounds have intermediate boiling point ranges, and have one or two hydroxy radicals, and may be employed for materials (such as particleboard or flake board) which are cured at lower temperatures.

In summary, the subject invention eliminates the disadvantages of conventional hardboard and particleboard made by the dry process, and specially in board thicker than ¼ inches, wherein the surfaces of such boards have low abrasion resistance, and are very absorptive of paint or adhesives. The subject invention eliminates these disadvantages by forming a hard, unitary, waterproof coating on the top surface of the hardboard. This coating includes a layer of dry paper, e.g., newsprint, added to a hardboard. The surface of the latter is wet with a solution of ethylene glycol and phenolic resin. The composite structure is cured by the application of heat and pressure. Composite panels produced in this manner are more stable and can be painted. They can be removed from the platens in the press without sticking. It is understood that the mass of the defibrated wood chips are bound together by hemicelluloses, lignins, and other natural binding elements of the wood. If desired, additional ingredients can be added, such as glues, waxes, and other binding materials. One of the particular features of the invention is the provision of an overlay ply of dry paper. The dry paper ply is added to the hardboard mat before curing and produces a nonsticking surface.

The foregoing and other objects and advantages of the present invention will be more readily apparent from the inspection of the accompanying drawings, taken in connection with the following specifications describing in detail an embodiment of the products produced and the method of making same according to the subject invention.

DETAILED DESCRIPTION OF THE DRAWINGS

FIG. 1 is a side view of the composite paper hardboard of the subject invention disposed in a press just prior to the curing operation;

FIG. 2 is a side view of the finished composite of the paper hardboard panel of the subject invention;

FIG. 3 is a diagrammatic plan view of the finished composite paper hardboard panel showing an embossed upper surface;

DESCRIPTION OF THE PREFERRED EMBODIMENT

Figure 4:
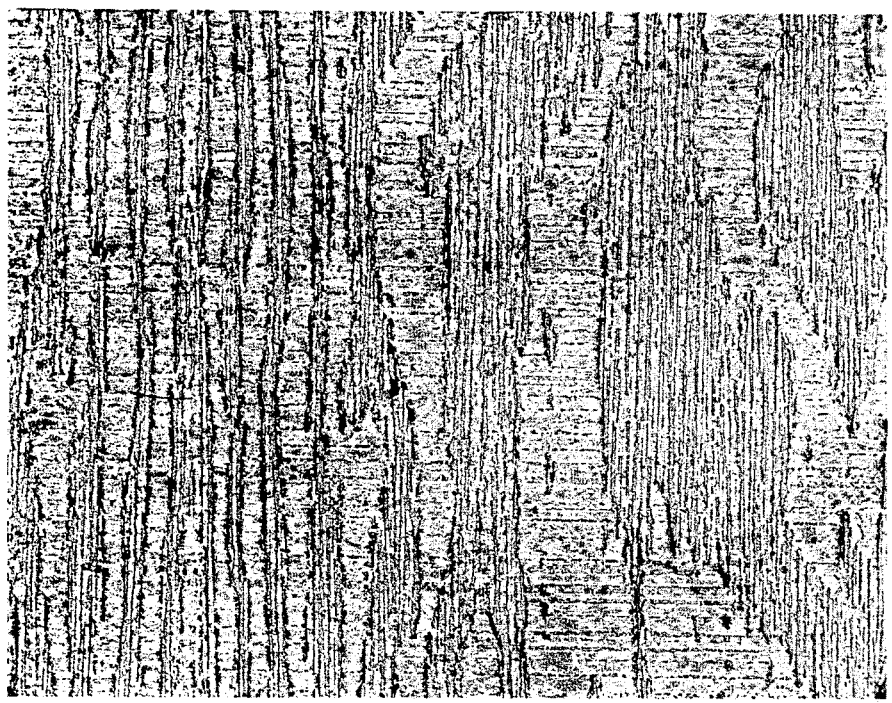
FIG. 4 is a plan view of an actual sample of finished hardboard made according to the subject invention.

Referring to FIG. 1, a platen press is shown including a base platen 10 and a top platen 11. A mixture of defibrated wood chips and binder is formed into a mat 12 and is coated with a glycol, resin solution. Wetting of the mat with the solution can be accomplished by spray or curtain coating. Next, a sheet of dry paper 13, such as newsprint which is absorbent, is laid on the mat 12. Gentle pressing of the paper 13 to the wetted surface of the mat 12 at the time of placement is sufficient to make it stay in place when the mat is transferred or loaded onto the platen press. The composition of the glycol, resin solution may be varied in percentage over a wide range, with one combination which gives satisfactory results consisting of ethylene glycol 25%, phenolic resin 12.5%, and water 62.5% (percentage by volume). It is noted that the paper 13 is not pre-wet. To obtain the resulting panel after surface flow deep enough to prevent a shallow layer of fines or fiber from peeling off, it is necessary to coat the mat 12 and have the transfer from the mat to the paper overlay 13. As indicated previously, wetting the mat can be accomplished by spray or curtain coating.

The composite assembly of the wetted mat 12 and the dry paper overlay 13, as described above, is then cured by the application of heat and pressure applied through the platens 10 and 11, to produce the finished composite paper hardboard panel, as illustrated in FIGS. 2 and 3. The platens 10 and 11 are heated to approximately 400° F or above, for a curing time of two minutes or longer, depending upon the thickness of the composite hardboard panel, and the thickness of the platens 10 and 11. Whereas hardboard is generally converted at temperatures in excess of 400° F, most flake or particleboards are converted at temperatures between 300° F and 400° F. Thus where the resulting composite structure is to have a mat 12 made of particleboard or flake or waferboard, the temperature of the platens would be adjusted to the range of 300° F to 400° F.

It is possible to emboss the surface of the composite panel by adding embossing raised portions to the upper platen 11. These surfaces 15 (FIGS. 2 and 3) may be in the form of a simulated wood grain or any other pattern, depending on the ultimate use of the panel.

Use of a low polymer of ethylene glycol, or a polyhydric alcohol or an ester thereof, is important in that these substances readily mix with water and has a boiling point higher than water. Hence it does not move readily from the surface during heating, and makes it possible to get a superior panel when the alcohol or ester is used in conjunction with the phenolic or similar resin to bond the paper overlay 13 to the hardboard during pressing. Ethylene glycol having a boiling point of 197.2° C is a member of the family of polyhydric compounds and of the polyhydric alcohols which can be used in the subject process. During curing, the ethylene glycol acts as a mild plasticizer so as to produce a tough surface, strong and firm in texture, but not brittle. The etheylene glycol also retains moisture near the surface of the board to cement the fibers together.

FIG. 4 illustrates a plan view of an actual sample of a composite paper hardboard panel made according to the subject invention. A comparative test was run in order to establish the variation in resistance to scuffing or abrading of: (1) a "control" panel which was made according to conventional techniques and does not include a dry paper overlay; and (2) "overlay" panel which was made according to the teaching of the subject invention. The apparatus employed was a Taber abrader using CS 17 wheels and 1000 grams weights, for 1000 cycles. Tabulated below is the measured "weight loss" and "thickness loss" for the "control" and "overlay" panels, which were measured during the test:

| Specimen | Weight Loss | Thickness Loss |
| --- | --- | --- |
| (1) "Control" panel | .7015 grams | .013 inches |
| (2) "Overlay" panel | .0763 grams | .0014 inches |

As can be readily determined from the above data, there is approximately 1000% improvement in resistance to scuffing or abrading when employing the subject process for the manufacture of a composite overlay panel. In addition, a visible peel test was used for prediction of performance of coated panels, in which a pressure sensitive tape was pressed against the surface and then stripped. The amount of fiber pull was observed. It was found that whereas for conventional panels the tape was nearly covered with material removed from the surface of the conventional panel, for the "overlay" panels, there was no fiber pull.

In another test to determine the surface strength of the respective panels, an internal bond test was employed wherein tensile loads were applied perpendicular to the surface of the panels. In the control panel it was observed that all of the failures were near the panel surface, whereas all of the failures in the "overlay" panel were in the core or near the panel center. The latter, of course, is more desirable.

Although reference has been primarily made throughout the specification to the manufacture of a composite paper hardboard panel, as noted above the subject process may also be employed in conjunction with the manufacture of new and improved flake, wafer or particleboard. As indicated above, normally the latter are converted at temperatures in the range of 300° F and 400° F, and the subject process could thus be adjusted to that temperature range.

From the above it is seen that applicant has invented a new process, and a new and improved composite paper particleboard panel, and in particular a composite paper hardboard panel having the desirable characteristics of excellent finishing properties, good paint holdout, resistance to scuffing, and clean cutting, as well as a panel in which the surface does not stick whereby it is not necessary to sand the resulting panels prior to the application of a finishing coat thereon.

It will, of course, be understood that various details of the invention may be varied in a wide range without departing from the spirit thereof, and it is therefore, not the purpose to limit the patent granted hereof otherwise than necessitated by the scope of the appended claims.

The embodiments of the invention in which an exclusive property or privilege is claimed is defined as follows:

1. In a method for the production of a composite, paper-overlaid panel comprising:
   a. forming a mat of lignocelluose particles and a binding agent of phenolic or modified phenolic resin;
   b. laying a dry sheet of paper over said mat; and
   c. curing said paper-overlaid mat at a temperature between 300° F to 400° F;

the improvement in which a solution comprising resin and polyhydric alcohol or ester thereof selected from the group consisting of ester of ethylene glycol, ester of glycerine, ethylene glycol, glycerine and polymer of ethylene glycol having a boiling point higher than that of water is applied to said mat prior to over-laying said sheet of paper.

2. The method of claim 1 in which the resin comprises phenolic or modified phenolic resin.

3. The method of claim 1 in which the solution is applied by spraying onto the mat.

* * * * *

UNITED STATES PATENT AND TRADEMARK OFFICE
CERTIFICATE OF CORRECTION

PATENT NO. : 4,053,339
DATED : October 11, 1977
INVENTOR(S) : Charles F. Story and Donald B. Gibson It is certified that error appears in the above—identified patent and that said Letters Patent are hereby corrected as shown below:

In Column 3, line 33, delete "after".

Signed and Sealed this

Seventh Day of March 1978

[SEAL]

Attest:

RUTH C. MASON
Attesting Officer

LUTRELLE F. PARKER
Acting Commissioner of Patents and Trademarks